United States Patent [19]

McKeown

[11] Patent Number: 4,679,248
[45] Date of Patent: Jul. 7, 1987

[54] TEST EQUIPMENT FOR SIMULATING MULTIPATH INTERFERENCE

[75] Inventor: James H. A. McKeown, Ipswich, England

[73] Assignee: British Telecommunications public limited company, Great Britain

[21] Appl. No.: 718,978

[22] Filed: Apr. 2, 1985

[30] Foreign Application Priority Data

Apr. 4, 1984 [GB] United Kingdom ................ 8408620

[51] Int. Cl.$^4$ ............................................. H04B 17/00
[52] U.S. Cl. ....................... 455/226; 455/65; 455/67; 324/57 N
[58] Field of Search .................... 455/65, 52, 67, 226, 455/115; 324/57 N, 77 G; 370/13

[56] References Cited

U.S. PATENT DOCUMENTS 3,471,855 10/1969 Thompson .
3,863,155 1/1975 Cornell ................................ 455/226
4,317,214 2/1982 Attinello ............................... 455/67

FOREIGN PATENT DOCUMENTS 2208293 8/1973 Fed. Rep. of Germany .
A58-68340 4/1983 Japan .

OTHER PUBLICATIONS

Systems Technology, "Applications of an Interference Cancellation Technique to Communications and Radar Systems", pp. 38–47 by T. A. Bristow.

Primary Examiner—Robert L. Griffin
Assistant Examiner—M. Huseman
Attorney, Agent, or Firm—Nixon & Vanderhye

[57] ABSTRACT

The invention relates to a device for simulating multipath interference in order that the correction stages of a radio receiver can be tested. The device includes parallel paths, simulating the multipath environment, and a pilot tone generator for introducing pilot tone into the paths. A feedback loop continuously adjusts the phase and amplitude of segments in the paths so as to cancel pilot tone from the output whereby the loop maintains the adjustment need for maximum attenuation at the frequency of the pilot tone.

26 Claims, 9 Drawing Figures

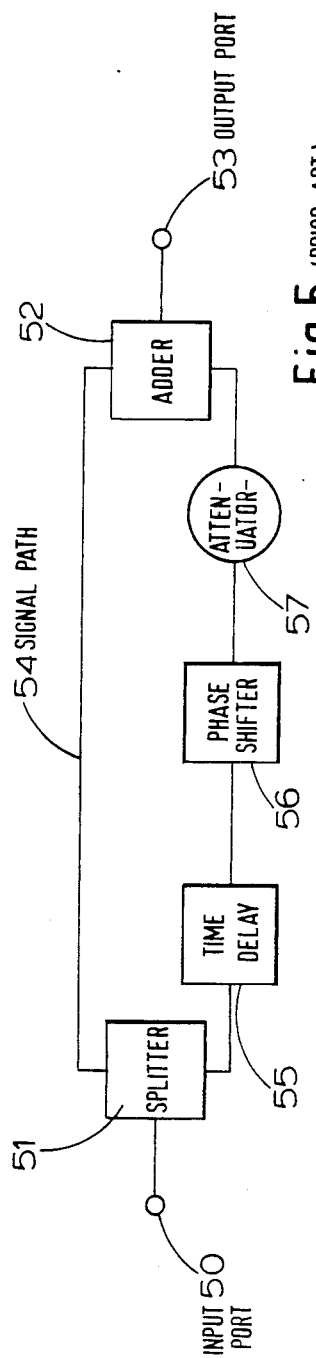
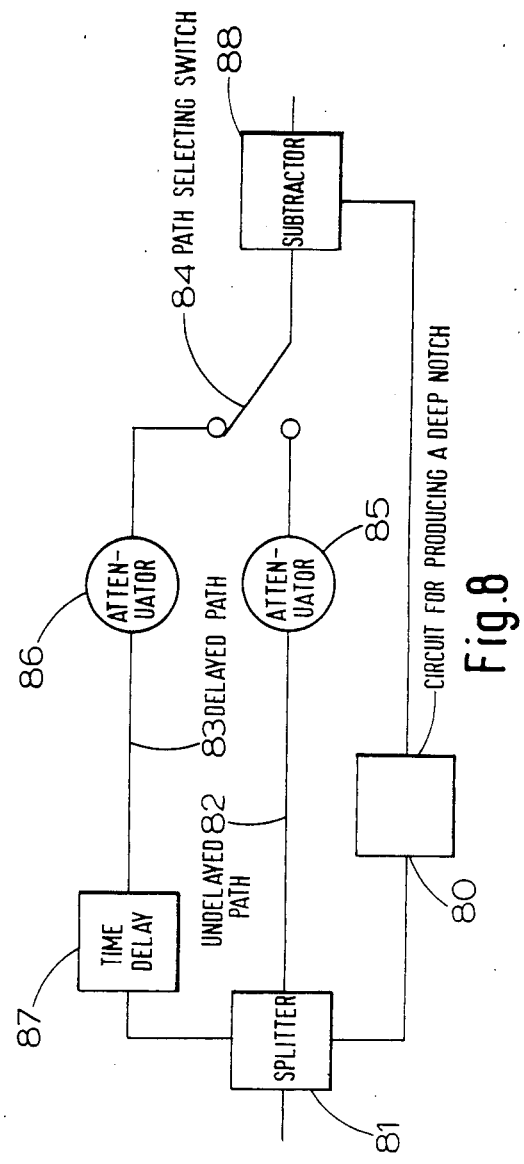

TEST EQUIPMENT FOR SIMULATING MULTIPATH INTERFERENCE

FIELD OF THE INVENTION

This invention relates to test equipment for simulating multipath interference. In particular the equipment finds application in testing radio receivers which include means for reducing the effect of multipath interference.

BACKGROUND OF THE INVENTION

Radio links are widely used in telecommunications, e.g. micro wave links operating at 1 to 20 GHz, and a linkage normally comprises a transmitter beamed to a receiver. It is the intention of the designer that the signals shall travel in a single line-of-sight path but, under certain conditions, reflection or diffraction may occur whereby the receiver obtains signals via more than one path. Since the paths are of different lengths the signals from the longer path are delayed and hence there are frequency dependent phase differences between the received signals. Under adverse conditions, these can cause severe distortion, e.g. notches in the frequency domain, and it is conventional to include in the receiver stages which are designed to reduce this effect.

In order to test these stages it is necessary to utilise test equipment which simulates the distortion so that their performance can be checked. The test equipment is inserted into the circuitry of a radio to be tested upstream of the correction stages, e.g. immediately after the frequency change for radios in which correction is applied during the IF stages or at base band. In order to check performance over a range of conditions it is necessary to adjust the test equipment to provide a variety of simulated interference conditions and, in particular, it is desirable to simulate 99 percent amplitude cancellation leaving a residue of about 1 percent. Since this is produced by a discrepancy between two almost equal paths it would be necessary to use very accurate components and components of sufficient accuracy are either not available at all or too costly for use in commercial equipment. It is an object of this invention to obtain the delay without the need for accurate components.

SUMMARY OF THE INVENTION

According to this invention test equipment for simulating multipath interference includes two parallel paths for passing transmitted signals or simulated transmitted signals to a combining circuit to produce signals containing simulated interference. A delay means is provided in one of the parallel paths for introducing relative delays into signals transmitted in the different paths. The test equipment further includes means for introducing a pilot tone into both parallel paths and a feedback loop including circuits for adjusting at least one of the paths so as to reduce, minimize or eliminate the pilot tone from the output.

In preferred embodiments the pilot tone is introduced before the parallel paths divide whereby the pilot tone divides into both paths. It is convenient to aim for complete attenuation of the frequency corresponding to the pilot tone and to provide variable attenuation by adding back a variable proportion of the original signal.

BRIEF DESCRIPTION OF THE DRAWINGS

The invention, which is defined in the claims, will now be described by way of example with reference to the accompanying drawings in which:

FIG. 5 shows a prior art circuit for simulating a notch;

FIG. 8 shows a circuit for producing deep notches adapted to make notches of various depths;

DESCRIPTION OF THE PREFERRED EMBODIMENTS

Figure 1:
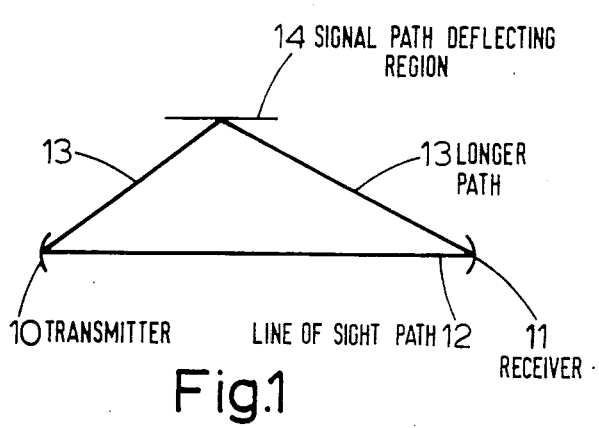
FIG. 1 illustrates the transmission paths which give rise to the notches.

FIG. 1 shows the cause of the interference which the test equipment is intended to simulate. A transmitter 10 is arranged for line-of-sight communication via path 12 to receiver 11. However, transient atmospheric conditions, as might appear in region 14, may cause refraction and/or reflection so that there is also communication via a longer path 13. The difference in length causes delays and thereby interference.

The two path transmission model of FIG. 1 has a frequency transfer function of the form:

$$H(\omega) = A[1 - B \exp(\pm j(\omega - \omega_0)T)]$$

Where:
  $\omega$ is the angular frequency
  A is the gain of path 12
  AB is the gain of path 13
  $\omega_0$ is an angular frequency at which maximum attenuation occurs. (There is an infinite set of such frequencies).
  T is the difference in delay between the delays of paths 13 and 12.

There are two distinct situations dependent on whether B<1 or B>1.

When B<1 (i.e. when the gain of the longer path 13 is less than that of the shorter path 12), we have $H(\omega) = A[1 - B \exp(-j(\omega - \omega_0)T]$. This is often referred to as a <<minimum phase>> condition.

When B>1 (i.e. when the gain of the longer path 13 is greater than that of the shorter path 12), we have $H(\omega) = A[1 - B \exp(j(\omega - \omega_0)T]$. This is referred to as <<non-minimum phase>> condition.

Figure 2:
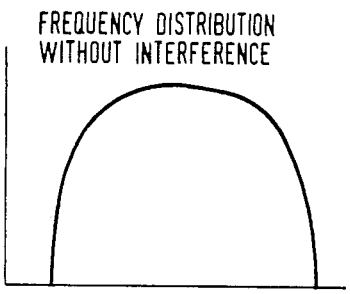
FIG. 2 illustrates the transmission band in the absence of interference.

FIG. 2 shows the frequency distribution of the signal in the absence of interference. It should be noted that the signal is symmetrical about a center frequency and this symmetry is important for good reception.

Figure 3:
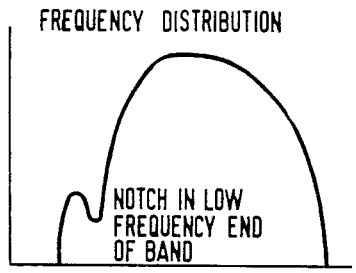
FIG. 3 illustrates the effect of interference on the transmission band.
Figure 4:
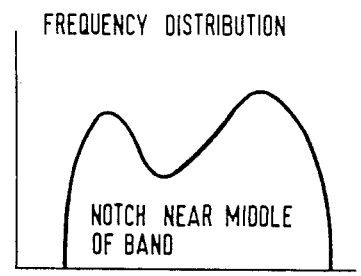
FIG. 4 illustrates the effect of interference in a different part of the band.

FIG. 3 shows the effect of a notch in the low frequency end of the band and it is apparent that this spoils the symmetry (which therefore adversely affects the reception). This particular frequency effect occurs for a certain difference in path lengths between the delayed and the direct signal. As this difference decreases, the interference moves across the band and FIG. 4 shows a notch near the middle of the band. As the difference increases further the notch would move to the other half of the band.

FIGS. 3 and 4 emphasize that the interference may be anywhere in the transmission band and the correction stages must try and cope with whatever interference arises. In order to assess the performance of the correction stages it is desirable to simulate interference in any part of the band. This requires a simulator which is not only accurate but also adjustable over the band of interest.

FIG. 5 shows a conventional circuit adapted to produce simulated interference. The circuit has a port 50 for receiving the input, e.g. from the frequency changer of a microwave radio, which connects directly to a splitter 51 to give two parallel paths to adder 52 which gives an output signal at port 53. Path 54 contains no components so the signal is passed on without modification. (Thus path 54 simulates path 12 of FIG. 1). The other path includes time-delay 55, phase shifter 56 and a variable attenuator 57. (This path simulates path 13 of FIG. 1.)

Although the circuit of FIG. 5 would work, it would need very accurate components. For example, it is desirable to test a radio receiver with notch depths of 99 percent, e.g. to leave a residue of 1 percent. Even a substantial error based on 1 percent is a very small error based on 99 percent and therefore all the components must be very accurate. In addition the accuracy must be achieved over the range of frequencies to which the circuit may be adjusted and this makes it impractical to realize the device shown in FIG. 5.

Figure 6:
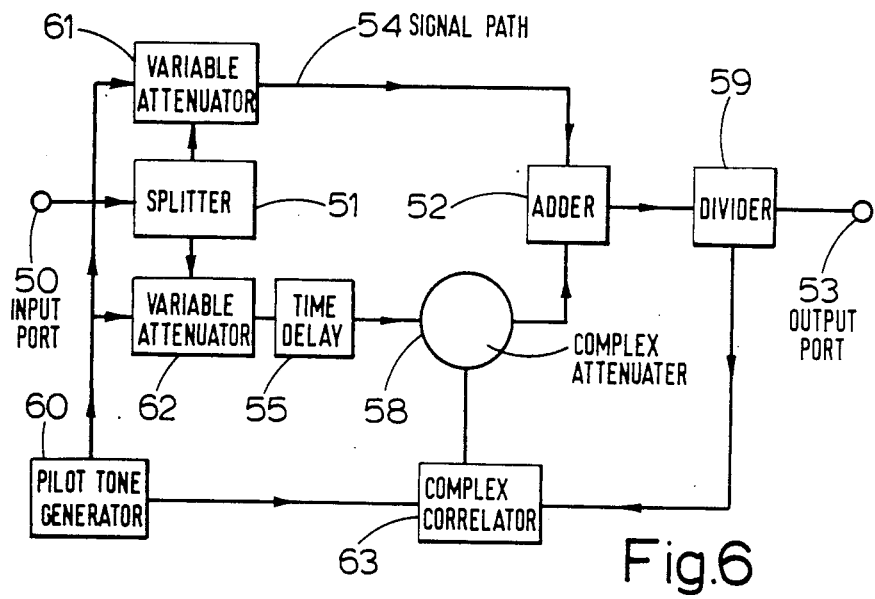
FIG. 6 shows a circuit according to the invention for producing notches.

FIG. 6 is a modification of FIG. 5 in accordance with the invention. With respect to each of the Figures described below components which are common to the circuits of FIGS. 5 through 9 have the same reference numerals. In the modified circuit phase shifter 56 and attenuator 57 are combined as a complex attenuator 58. Also a pilot tone generator 60 is connected to feed pilot tone into both parallel paths via variable attenuators 61 and 62. The output from adder 52 is split in divider 59 and one path is connected to port 53. The other path is connected to complex correlator 63 which is also connected to generator 60. Thus complex correlator 63 produces outputs representing the amount and phase of pilot in the output from adder 52. Complex correlator 63 is connected to adjust complex attenuator 58 so that the amount of pilot in the output is minimized.

In the use of the circuit of FIG. 6 transmission signals (or simulated transmission signals) are acquired at port 50 and split into the two paths 54 and the path defined in part by components 55 and 58 so that differential delays are introduced. Adder 52 combines the two signals so that the output at port 53 contains simulated multipath interference. Generator 60 adds a pilot tone to both paths, the relative levels being adjustable by attenuators 61 and 62. The pilot tone (in the same way as the transmission signal) is subjected to relative delay so that the cancellation occurs in adder 52. Complex correlator 63 receives (a) pilot tone and (b) the output of the adder 52 and it produces a signal representing the amount and phase relationship of the pilot in the output. This signal adjusts complex attenuator 58 so that the pilot from attenuator 58 cancels the pilot in path 54. (The cancellation will be complete allowing for imperfections in the components.) It should be noted that the degree of attenuation in attenuator 58 will be set to match the attenuation applied by attenuator 61. If the attenuation set by attenuator 61 is high very little of the delayed signal will pass to adder 52; i.e. there will be a shallow minimum phase notch. Thus it can be seen that attenuator 61 sets the notch depth whereas the generator 60 sets the notch frequency. The device shown in FIG. 6 is readily adjustable for accurate simulation of notches and the notch can be located anywhere within the transmission band.

Figure 7:
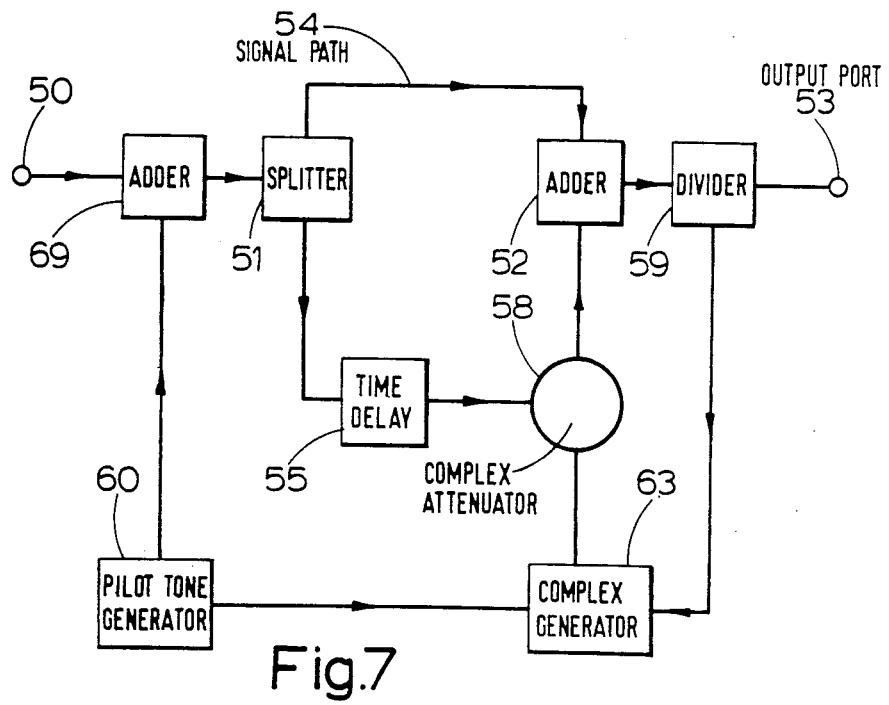
FIG. 7 shows a modification of the circuit of FIG. 6 to produce deep notches.

The circuit shown in FIG. 7 is similar to that shown in FIG. 6 but the pilot tone is injected, by adder 69, upstream of the divider 51. Thus the pilot tone is separated into both paths in the same way that signal frequencies are separated. As described with reference to FIG. 6, the complex correlator 63 and the complex attenuator 58 adjust the relative amplitude and phase so that there is substantially complete cancellation of pilot tone at output port 53. Thus the circuit produces a very deep notch at the frequency of the tone generated by the generator 60.

To produce a variable depth, a deep notch can be partly filled in by adding to the output a suitable proportion of the transmission signal. A circuit for filling in the notch is shown in FIG. 8.

In FIG. 8, box 80 represents a circuit adapted to produce a very deep notch but adjustable to give its maximum effect at any selected frequency within the band of interest. Box 80 is conveniently the circuit illustrated in FIG. 7.

There are two paths, i.e. paths 82 and 83, in parallel with box 80. These paths are obtained from splitter 81. Switch 84 selects one of paths 82 or 83 for combination with the output of box 80 in subtractor 88. Path 82 contains attenuator 85 whereas path 83 contains time-delay 87 and attenuator 86. Box 80 provides the transfer function $$H(\omega)=A[-B\exp(\pm j(\omega-\omega_0)T)]$$

as given above but limited to the case where $B=1$. When path 82 is selected by switch 84, undelayed signal, attenuated by attenuator 85, is subtracted from the output of box 80. This subtraction attenuates that part of the output of box 80 which can be regarded as undelayed signal hence giving values of B above 1. When path 83 is selected the delayed part is attenuated giving values of B in the range 0 to 1.

Thus FIG. 8 shows how to separate two aspects of the circuit. Box 80 defines the value of $\omega_0$ but only in the case where $B=1$. Paths 82 and 83 control B but not $\omega_0$.

Figure 9:
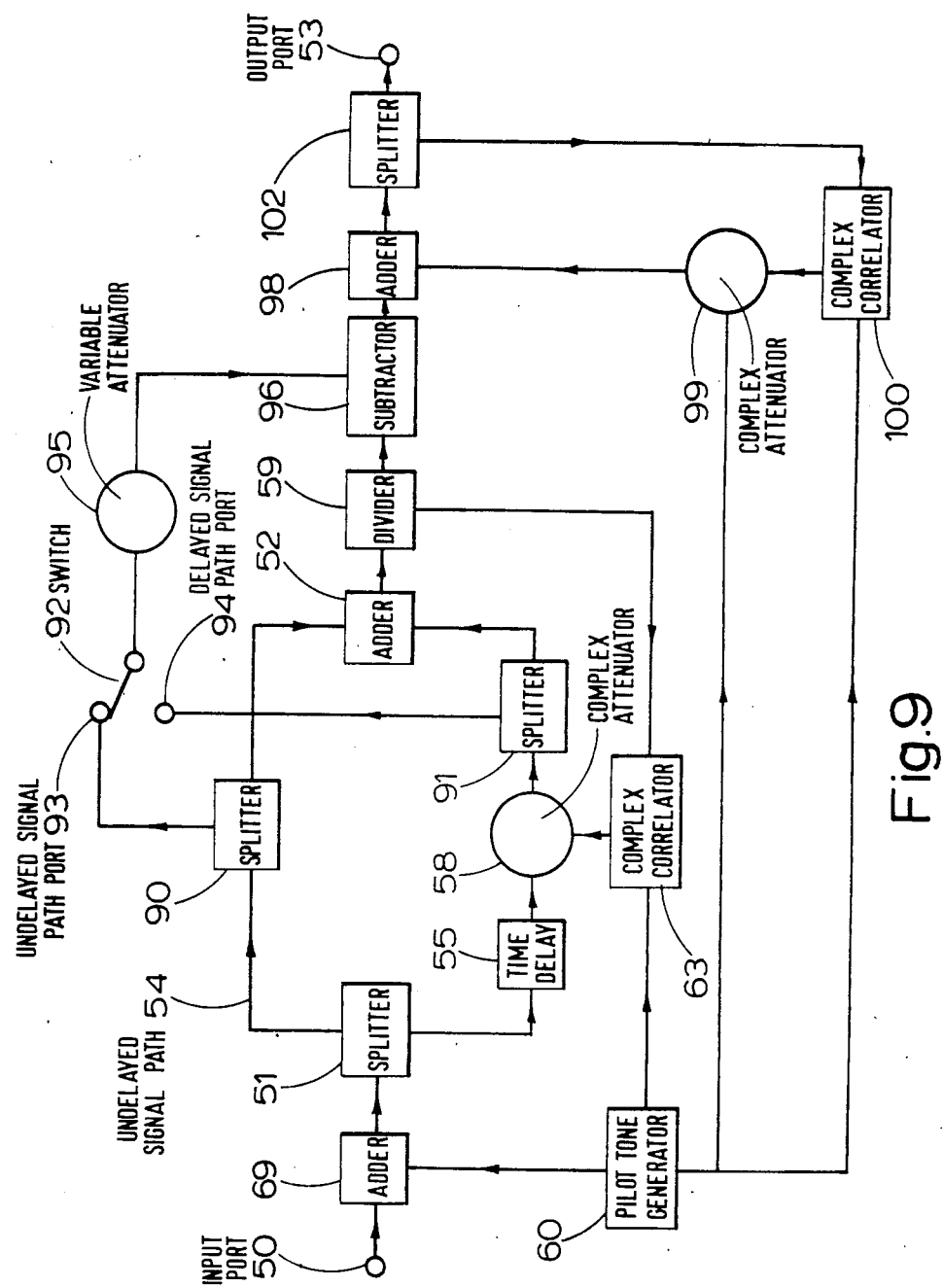
FIG. 9 shows another version of the invention.

As shown in FIG. 9, parameter B is varied by a signal obtained, in the alternative, from one of the two parallel paths of FIG. 7. This introduces pilot tone into the output. FIG. 9 shows a circuit which uses this principle and cancels the pilot tone (but only those items which modify FIG. 7 will be described).

Path 54 contains a splitter 90 which produces undelayed signal (plus pilot tone) to port 93 of switch 92. The output of complex attenuator 58 passes to a splitter 91 which provides delayed signal to port 94 of switch 92. Thus switch 92 can select either delayed or undelayed signal to variable attenuator 95 and subtractor 96, and which incorporates the additional signal in the output of the circuit.

It will be appreciated this circuit operates in a similar manner to the circuit of FIG. 8. The cancellation mode of operation is chosen because this gives parameter B a wider range of values with a single attenuator 95. Thus, with switch 92 to port 93 undelayed signal is attenuated giving non-minimum phase notches. When port 94 is selected delayed signal is attenuated giving minimum phase notches.

It will be appreciated that the signal from subtractor 96 includes pilot tone and this is removed from the output by the addition of an anti-phase signal.

Thus the circuit of FIG. 9 also includes adder 98 which receives output from subtractor 96. The output from adder 98 is split in splitter 102 to provide an input to complex correlator 100 which also receives pilot tone from generator 60. The correlator 100 produces control signals which represent the amount of pilot in the output and these control complex attenuator 99 which receives pilot tone as input to produce a cancellation signal which is added to the output in adder 98.

The circuits described above provide independent control of notch frequencies and depth but, as described, there is no independent control notch frequency interval.

As shown in the drawings time-delay 55 takes the form of a suitable length of coax cable which delays all frequencies of interest by approximately the same time. Clearly the attenuation is dependent on the phase shift and therefore the attenuating effect of element 55 is frequency dependent because the relationship between time delay and phase shift is frequency dependent.

The combination of complex attenuator 58 and complex correlator 63, which operates conventionally by independent attenuation of quadrature phases, produces an effect which is substantially independent of frequency because the quadrature phasing extends over a wide range of frequencies.

The provision of a choice of time-delays 55 (not shown in any drawing) gives the circuit extra flexibility enabling an operator to simulate a wider range of conditions.

Clearly the device described above, when inserted into the circuit of a radio receiver, enables a test engineer to submit the correction stage to a wide variety of interference effects and thereby evaluate the performance of the correction stage.

I claim:

1. Equipment for simulating multipath interference of various depths which comprises:
    (a) first means for simulating multipath interference by simulating a deep notch in the frequency domain response of an input signal transmitted therethrough to produce an intermediate signal;
    (b) second means for delaying and for combining a delayed or undelayed attenuated copy of said input signal with said intermediate signal to produce an output signal having a predetermined severity of maximum attenuation at said notch in the frequency domain.

2. Equipment for simulating multipath interference comprising:
    (a) means for combining signals into a composite signal so as to simulate interference caused by the interaction of said signals,
    (b) parallel paths for passing signals in the parallel paths to said means for combining to produce said composite signal,
    (c) delay means for introducing delay into at least one of said paths,
    (d) means for introducing a pilot tone into the parallel paths, and
    (e) a feedback means connected to adjust the transfer characteristics of at least one of the parallel paths for reducing the amount of pilot tone in said composite signal.

3. Equipment according to claim 2, wherein said equipment includes a pilot tone generator connected to introduce the pilot tone into a common input path which is thereafter divided into said parallel paths.

4. Equipment according to claim 3, wherein the feedback means comprises a complex correlator means connected to receive as inputs pilot tone from said generator and the composite signal for producing therefrom a control signal indicative of the amount of pilot tone contained in the composite signal.

5. Equipment according to claim 4 wherein one of the parallel paths includes variable attenuator means for adjusting the phase and amplitude of signals transmitted therealong, said variable attenuator means being operatively connected to said complex correlator to receive said control signal.

6. Equipment for simulating multipath interference, which equipment includes:
    (a) splitter means;
    (b) adder means for combining a plurality of signals so as to simulate interference caused by the interaction of said signals;
    (c) an input path for conveying input signals to said splitter means;
    (d) an output path for conveying combined signals from said adder means;
    (e) a delay path for conveying signals from said splitter means to said adder means;
    (f) a second path for conveying signals from said splitter means to said adder means, said second path being in parallel with said delay path;
    (g) controllable complex attenuator means situated in said delay path, said complex attenuation means producing controlled phase alterations to signals being carried in said second path;
    (h) complex correlator means having an output connected to provide a control signal to said complex attenuation means and being connected to receive as inputs pilot tone from said pilot tone generator and combined signals from said output path, said complex correlator means being such that the control signals which it produces as output are related to the phase and amplitude of the pilot tone in the output path;
    the controllable complex attenuation means causing the pilot tone in the second path to cancel the pilot tone in the delay path when combined in the adder means whereby a deep notch having maximum effect at the frequency of the pilot tone is simulated.

7. Equipment according to claim 6, which includes a notch depth adjustment path and a second adder means, wherein said second adder means is connected to the output path and the notch depth adjustment path, said notch depth adjustment path including switch means for effecting connections to receive signals from either the delay path or the second path and containing means for adjusting the amplitude of signals contained in the notch depth adjustment path whereby the second adder reduces the depth of the notch in signals in the output path.

8. Equipment according to claim 7, which includes cancellation means for introducing the pilot tone into the output of the second adder so as to cancel pilot tone introduced therein from the notch depth adjustment path.

9. Equipment for simulating multipath interference of various notch depths comprising:
an input port for receiving a signal, delay means for generating a delayed version of said signal, an output port, a combining means having an output connected to said output port and including
(a) means for simulating a notch having a fixed depth, and
(b) means for selecting said delayed version of said signal or an undelayed version of the signal received at said input port and for transmitting the selected signal to said combining means, said combining means including means responsive to said selected signal and the output of said means for simulating a notch having a fixed depth for generating a notch of a depth other than said fixed depth, whereby the combined signals provided to said output port have a notch the depth of which may be controllably varied.

10. Equipment according to claim 9 whereby the combined signals provided to said output port have a notch which is lesser in depth than said fixed depth.

11. Equipment for simulating multipath interference, comprising: (a) multipath simulation means comprising: input means for receiving signals; first combining means having an output; first and second parallel paths, interconnecting said input means and said first combining means, for conveying signals received from said input means to said first combining means, said first combining means for combining signals on said first and second parallel paths and for generating output signals at said output; delay means for introducing delay into said first parallel path; pilot tone generating means for introducing pilot tone into the parallel paths; complex correlator means connected to receive as inputs said pilot tone from said generator and said output signals appearing at the output of said first combining means, and operating to produce therefrom control signals related to the phase and amplitude of the signals at the frequency of said pilot tone appearing at the said output of said first combining means; controllable complex attenuator means situated in said first parallel path, connected to receive said control signals from said complex correlator means, and operating so that signals at the frequency of said pilot tone in each said parallel paths cancel each other when combined in said first combining means; to provide signals having a notch centered at the frequency of the pilot tone; and (b) notch depth control means including: third and fourth paths; path selection means; and variable attenuator means; said path selection means operating to connect either said third path between said first parallel path and said variable attenuator means, or, said fourth path between said second parallel path and said variable attenuator means to respectively provide variably attenuated, delayed or undelayed, signals; second combining means connected to combine the signals provided by the means specified in (a) and (b) to provide signals having a notch of a depth which varies from that of the signals provided by the multipath simulation means.

12. Equipment according to claim 11, wherein the combined signals have a notch of a lesser depth than that of the signals provided by the multipath simulation means.

13. Equipment according to claim 11 which further includes cancellation means for transmitting an antiphase pilot tone to said second combining means so as to cancel pilot tone introduced therein from the notch depth control means.

14. Equipment for simulating multipath interference of various notch depths for connection into the signal path of a radio to be tested, said equipment comprising: an input port; an output port; a combining means, the output of which is connected to said output port; and (a) multipath simulation means connected between said input port and said combining means, to process signals appearing at said input port in order to provide to said combining means signals having a notch of fixed depth; and (b) notch depth control means connected between said input port and said combining means, said notch depth control means including attenuator means to provide signals appearing at said input port variably attenuated to the combining means; said combining means including means receiving signals from said multipath simulation means and said notch depth control means for generating a combined signal having a notch of a depth other than said fixed depth, whereby the signals provided to the output port have a notch may be controllably varied.

15. Equipment according to claim 14 wherein the signals provided to the output port have a notch of a depth which is less than said fixed depth.

16. Equipment according to claim 14, wherein the multipath simulation means specified in part (a) comprises: input means; first combining means; two parallel paths interconnecting said input means and said first combining means; delay means for introducing relative delay into said parallel paths; pilot tone generating means and means for introducing the pilot tone into said parallel paths; and a feedback means connected from the output of said first combining means to one of said parallel paths, operating to reduce the level of signals at the frequency of said pilot tone appearing at the output of said first combining means.

17. Equipment according to claim 16 further including adder means having first and second inputs and an output, said first input being connected to said input port and said second input being connected to said means for introducing the pilot tone, said adder output being connected to said parallel paths whereby said means for introducing said pilot tone is connected to introduce said pilot tone upstream of said parallel paths.

18. Equipment according to claim 17 wherein said feedback means comprises a complex correlator means connected to receive as inputs said pilot tone from said generator and the signals appearing at the output of said first combining means, and operating to produce therefrom a control signal related to the phase and amplitude of the signals at the frequency of said pilot tone appearing at said output of said first combining means.

19. Equipment according to claim 18 wherein one of said parallel paths includes a controllable complex attenuator means for adjusting phase and amplitude of signals on said one of said parallel paths, said controllable complex attenuator means being connected to receive said control signals from said complex correlator means.

20. Equipment according to claim 14, wherein the notch depth control means specified in part (b) further comprises variable delay means to provide variably attenuated, delayed or undelayed, signals to said combining means.

21. Equipment according to claim 14, wherein the notch depth control means specified in part (b) comprises: two path, both of which include a variable attenuator means, and one of which includes delay means; and path selection means operating to selectively connect one or other of said paths between said input port and said combining means.

22. Equipment for simulating multipath interference of various notch depths comprising: input means for receiving signals, first combining means, two parallel paths, interconnecting said input means and said first combining means, for conveying signals received from said input mens to said first combining means, delay means for introducing relative delay into said parallel paths, means in at least one of the parallel paths for controlling the notch depth, pilot tone means connected to said parallel paths for controlling the notch frequency, said first combining means including means for combining the signals on said parallel path to generate an output containing simulated multipath interference.

23. Equipment according to claim 22 wherein said pilot tone means includes pilot tone generating means and means for introducing the pilot tone into said parallel paths; and wherein said equipment further includes feedback means connected from the output of said combining means to one of said parallel paths, operating to reduce the level of signals at the frequency of said pilot tone appearing at the output of said combining means.

24. Equipment according to claim 23 wherein said feedback means comprises a complex correlator means connected to receive as inputs said pilot tone from said generator and the signals appearing at the output of said combining means, and operating to produce therefrom a control signal related to the phase and amplitude of the signals at the frequency of said pilot tone appearing at said output of said first combining means.

25. Equipment according to claim 24 wherein one of said parallel paths includes controllable complex attenuator means for adjusting phase and amplitude, said controllable complex attenuator means being connected to receive said control signal from said complex correlator means.

26. Test equipment for simulating multipath interference by processing input signals to produce output signals having a notch of controlled magnitude and position in the frequency domain input/output transfer characteristic of said test equipment, said equipment comprising:

plural signal propagation paths; at least one of which includes time delay means and a controllable complex attenuator;

splitter means connected to split an input signal and pass it along each of said propagation paths;

signal combining means connected to combine signals emanating from said propagation paths into a common output path;

a pilot tone generator for producing a pilot signal having a frequency located in the frequency domain at the position where said notch is to be located, said generator being connected to introduce said pilot signal into at least one of said propagation paths at a predetermined point;

signal divider means connected in said common output path to divide off a sample signal of the signal propagating therealong;

signal correlator means connected to compare said sample signal with said pilot signal and to produce a control signal which is connected to control said complex attenuator to reduce the magnitude of pilot tone signal propagating in said common output path; and notch magnitude control means disposed in at least one of said signal propagation paths for controllably changing the magnitude of said notch.

* * * * *

UNITED STATES PATENT AND TRADEMARK OFFICE
CERTIFICATE OF CORRECTION

PATENT NO. : 4,679,248

DATED : July 7, 1987

INVENTOR(S) : McKeown

It is certified that error appears in the above-identified patent and that said Letters Patent is hereby corrected as shown below:

In claim 14, at column 8, line 21, between "notch" and "may", insert --which--.

Signed and Sealed this

Twenty-seventh Day of September, 1988

Attest:

DONALD J. QUIGG

*Attesting Officer*                     *Commissioner of Patents and Trademarks*